United States Patent [19]

Zuelke et al.

[11] Patent Number: 4,626,099

[45] Date of Patent: Dec. 2, 1986

[54] FILM DUPLICATION SYSTEM FOR MICROIMAGE RECORDERS

[75] Inventors: Robert D. Zuelke, Wheeling; Paul H. Friedrich, Glenview; David G. Stites, Elgin, all of Ill.

[73] Assignee: Bell & Howell Company, Chicago, Ill.

[21] Appl. No.: 788,283

[22] Filed: Oct. 17, 1985

[51] Int. Cl.[4] ............................................. G03B 27/04
[52] U.S. Cl. ...................................... 355/99; 355/91; 355/100
[58] Field of Search ................................... 355/99–103, 355/85, 86, 87, 91

[56] References Cited

U.S. PATENT DOCUMENTS

2,515,420  7/1950  Oakhill ................................. 355/101
3,768,906  10/1973  Michelson et al. .................. 355/100

Primary Examiner—Richard A. Wintercorn
Attorney, Agent, or Firm—Neal C. Johnson; Philip C. Peterson; Stanley J. Tomsa

[57] ABSTRACT

A microimage recording apparatus of the type utilizing an elongated master film strip movable along a master film processing path and a duplicate film strip movable along a duplicate film strip processing path for making duplicates of successive developed image areas on the master film strip includes a duplication station having a support for the master film strip to position a developed image area thereon in a duplication position along the master film strip path. Support is provided for the duplicate film strip along a segment of the duplicate film processing path merging with the master film strip path at the duplication station. The master and duplicate film strips are biased together in close contact at the duplication station against a glass platen and light is passed through a developed image area on the master film strip to create a latent, duplicate image area on the duplicate film strip for subsequent development. A master film transport system is provided for moving successive developed image areas into and out of the duplication position along the segment of merged film paths and a separately controlled duplicate film transport apparatus is provided for positioning and moving the duplicate film into and out of the duplication position for exposing the duplicate film through a selected developed image area on the master film strip to make one or more duplicates thereof.

34 Claims, 9 Drawing Figures

FILM DUPLICATION SYSTEM FOR MICROIMAGE RECORDERS

BACKGROUND OF THE INVENTION

1. Field of the Invention

The present invention relates generally to micrographics and in particular to an improved system and method for operating microimage recorders such as COM (computer output on microfilm) recorders. More particularly, the present invention is directed towards a duplicate film exposure and developing system for microimage recording apparatus wherein duplicate film records on rolls or microfiche cards are produced from the computer generated images provided on a continuous elongated master film strip. The duplication system of the present invention is capable of producing any selected number of duplicates from a single image area provided on a master film strip. Because enormous amounts of information and data is generated by computers and other sources, the need for convenient and economical systems for duplicating this data has increased rapidly in the last few years.

2. Description of the Prior Art

U.S. Pat. Nos. 4,123,157, 4,332,466, 4,382,675 and 4,501,487 disclose microimage recorders generally wherein image areas are exposed onto film and then transferred onto duplicate film cards or rolls. In general, the image generated by cathode ray tubes are exposed onto a master film which is subsequently developed and used for making duplicates therefrom.

OBJECTS OF THE INVENTION

It is an object of the present invention to provide a new and improved microimage recording apparatus and in particular a new and improved film duplication system for microimage recorders.

It is another object of the invention to provide a new and improved film duplication system for producing a selected number of duplicates from a single image area on a master film strip.

It is another object of the present invention to provide a new and improved duplicating station for producing high quality duplicate image areas on a duplicate film strip in a contact printing process wherein controlled light is passed through developed images on a master film strip to form latent images on a duplicate film strip which are subsequently developed.

Yet another object of the present invention is to provide a new and improved film duplication system for microimage recorders capable of producing any selected number of duplicates from a single image area provided on a master film strip.

It is an object of the present invention to provide a film duplication system especially designed and adapted for use within a self-contained COM microimage recorder of the type disclosed in copending U.S. patent application Ser. No. 787,812, filed on Oct. 15, 1985, and hereby incorporated herein by reference.

SUMMARY OF THE INVENTION

The foregoing and other objects and advantages of the present invention are accomplished in an illustrated embodiment comprising a new and improved film duplication system for microimage recorders of the type employing an elongated master film strip movable along a master film processing path and providing a duplication station therein for making duplicates on a duplicate film strip from successive developed image areas on the master film strip. The duplication system includes a support for maintaining a master film strip with a developed image area thereon in a duplication position along the master film strip processing path and includes apparatus for moving the duplicate film strip along a duplicate film processing path which merges with a segment of the master film path at a duplication position. A vacuum belt clamping assembly is provided for moving the duplicate film strip back and forth as required along the duplicate film processing path and the vacuum belt is also movable between a film clamping position wherein the master film and duplicate film are biased closely into contact in the duplication position while an exposure cycle takes place and a non-clamping position wherein the film strips are moved apart from one another permitting independent travel of the master film strip and the duplicate film strip as required. Latent image areas are formed on the duplicate film strip while at the duplication position by the controlled exposure of light which passes through a developed image area on the master film strip at the station. The level of light entering and the time of exposure are precisely controlled and the system is capable of making any desired number of duplicate image areas on the duplicate film strip from a single image area on the master film strip.

BRIEF DESCRIPTION OF THE DRAWINGS

The foregoing and other objects and advantages of the present invention are best understood from a consideration of the following detailed description taken in conjunction with the accompanying drawings, in which.

DETAILED DESCRIPTION OF A PREFERRED EMBODIMENT OF THE PRESENT INVENTION

Figure 1:
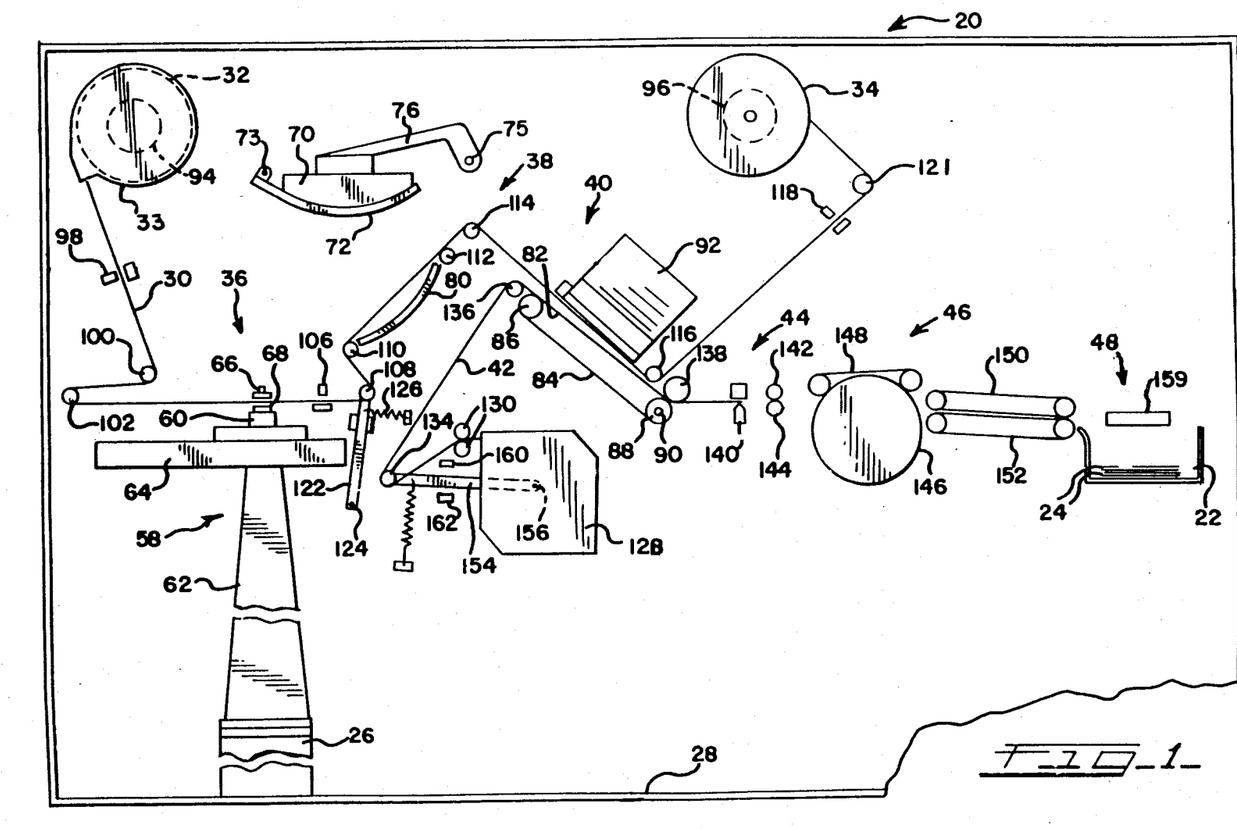
FIG. 1 is a schematic and diagrammatic front elevational view of a complete microimage recording apparatus including a film duplication system constructed in accordance with the features of the present invention.
Figure 2:
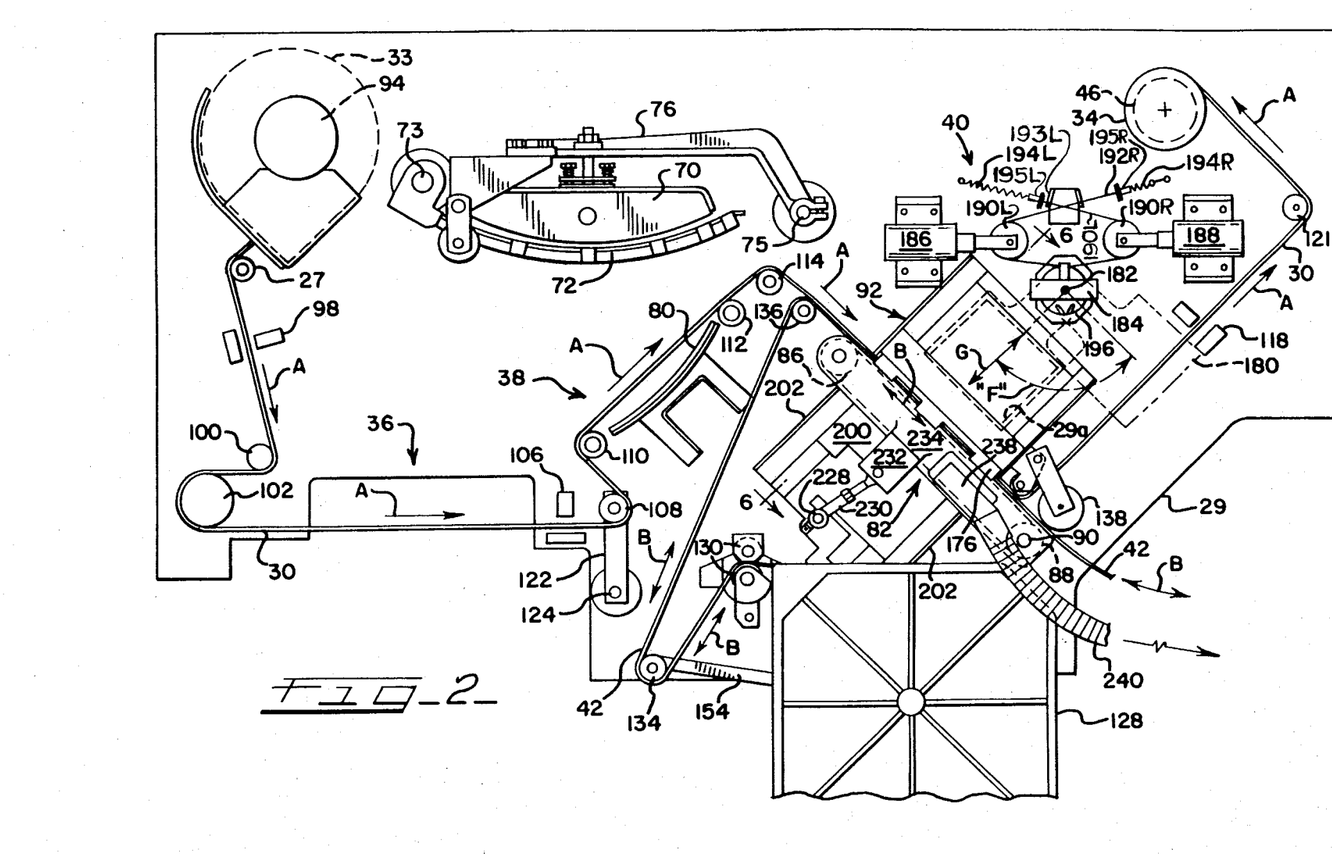
FIG. 2 is an enlarged front elevational view of a new and improved film duplication system for making one or more duplicates of image areas developed on a master film strip moved in sequence along a master film strip processing path.

Referring now more particularly to the drawings and initially to FIGS. 1 and 2, therein is illustrated in schematic and diagrammatic form, a self-contained microimage recorder system adapted to provide complete microfiche records or film rolls from computer generated images developed initially on a master film strip. The self-contained COM (computer output on microfilm) microimage recorder is of the type disclosed in copending U.S. patent application Ser. No. 787,812, filed on Oct. 15, 1985, and incorporated herein by reference.

The microimage recorder is generally referred to as a whole by the reference numeral 20 and comprises an integral, self-contained unit adapted to provide at a record output port 22, a series of complete, discrete microfiche record cards 24. Each card bears an image pattern corresponding to a sequence of computer generated images which are presented by a cathode ray tube or CRT 26. The microimage recorder 20 is housed in a self-supporting enclosure or cabinet 28 having a vertically upstanding base plate or chassis wall 29 that is spaced intermediately between accessible front and rear access doors of the housing (not shown). The chassis 29 provides support for the multiple system components of the complete microimage recorder apparatus and divides the cabinet or housing 28 between a film processing section and a control, drive and power section behind the chassis.

Figure 3:
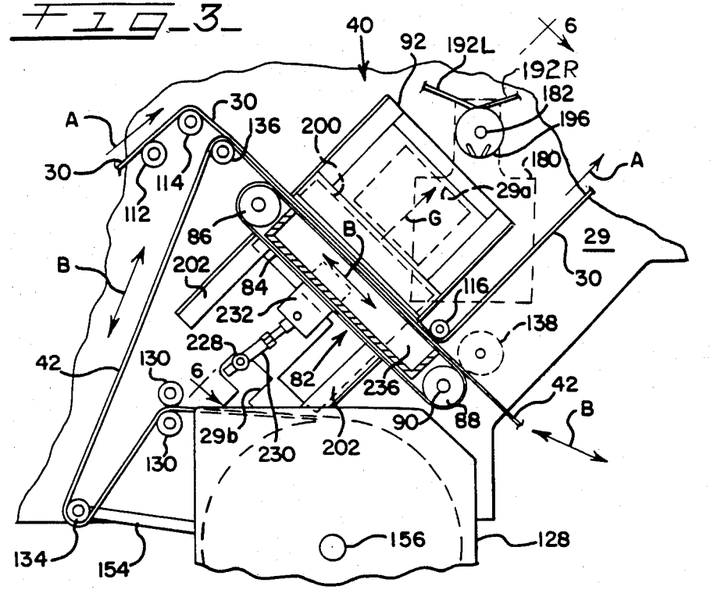
FIG. 3 is a fragmentary front elevational view of the film duplication system showing some of the internal details thereof.
Figure 4:
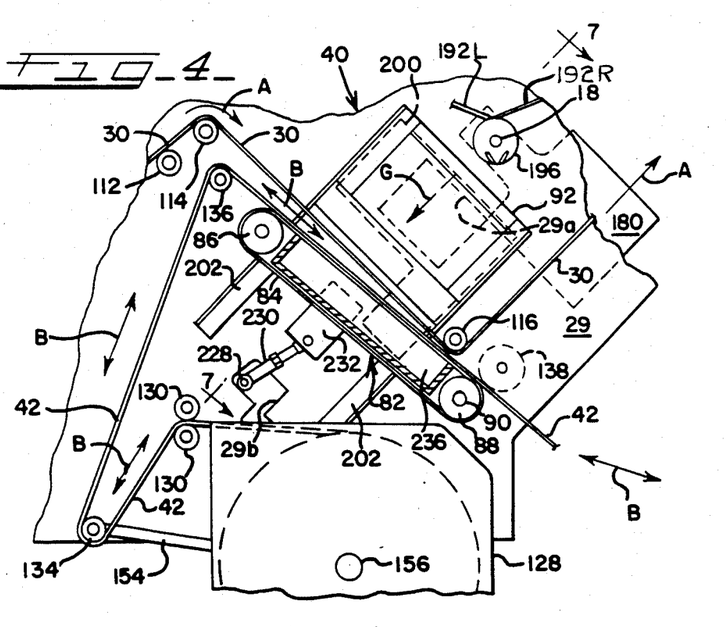
FIG. 4 is a fragmentary front elevational view of the film duplication system similar to FIG. 3 but illustrating components thereof in a different operative position permitting relative movement between the respective master and duplicate film strips.

An elongated film strip 30 comprising a master film is moved along a master film processing path as indicated by arrows A in FIGS. 2, 3 and 4 and the path extends between a film supply spool 32 and a film takeup spool 34. The supply spool is powered by a drive motor 94 mounted on the rearward side of the chassis 29 and the takeup spool is similarly powered by a drive motor 96, also mounted on the rearward face of the chassis wall. The drive motors 94 and 96 are energized to advance or reverse the movement or transport of the master film strip along the master film path and these motors are driven to normally exert and maintain a desired amount of film tension on the film strip, for example, approximately five pounds. The supply spool 32 is contained within a light tight cartridge 33 preferably of the type disclosed in copending U.S. patent application Ser. No. 787,836, filed on Oct. 16, 1985, and incorporated herein by reference.

The master film strip 30 is advanced along the master film processing path (arrows A) through an exposure station 36, a master film developing station 38 and a film duplication station generally designated by the numeral 40 and constructed in accordance with the features of the present invention. Successive developed image areas on the master film strip 30 are positioned at the duplication station ready for a duplicating process wherein one or more duplicate of an image area on the master film is formed on a duplicate film strip 42. Any number of duplicate image areas may be exposed in sequence on the duplicate film strip 42 from a single image area on the master film strip 30 at the duplication station.

The duplicate film is supplied from a spool carried in a duplicate film supply cartridge 128 and the duplicate film strip is movable in opposite directions along a duplicate film processing path as indicated by double headed arrows B in FIGS. 2, 3 and 4. After a latent duplicate image is formed on the film strip 42 at the duplication station 40, the image area is subsequently developed at a duplicate film developing station designated 46 and after developing, the film is eventually passed to a clearing station generally designated as 48 adjacent the outlet port 22. Between the duplication station 40 and the duplicate film developing station 46 the film strip passes through a cutting station 44 where individual record cards or microfiche cards 24 are produced from the elongated film strip by a knife assembly 140 which effects a transverse cutting of the film strip into individual record cards.

In accordance with the present invention, any selected number of individual microfiche or record cards 24 can be made from a single image area on the master film strip 30 while the master film strip is positioned at the duplication station 40. After a particular image area on the master film strip is duplicated on the duplicate film strip 42 as desired, the master film strip moves or advances along the master film processing path and is eventually wound or taken up on the takeup spool 34 driven by the takeup drive motor 96.

The master film strip 30 and the duplicate film strip 42 move linearly along their respective continuous paths and at the duplication station 40, these paths all merged together or overlap momentarily so that in a contact printing process, a developed image area on the master film strip at the duplication station may be transferred onto the duplicate film strip in contact therewith by the application of light in a controlled exposure cycle as will be described more fully hereinafter. The respective film strips 30 and 42 are movable independently of one another and any selected number of duplicates may be generated from a single image area on the master film strip at the duplication station.

The foregoing process is accomplished without any necessity for complex relative movement of film transports, film cartridges and the like, and the duplicate film strip 42 is eventually consumed within the self-contained microimage recorder 20 as cutting of the individual microfiche records or cards 24 from the continuous duplicate film strip takes place.

Preferably, the master film strip 30 comprises a dry silver, COM type film approximately 105 mm in width such as a No. 8500 film offered by the 3M Corporation. This film is highly sensitive to light and has a relatively high film speed. The duplicate film strip 42, on the other hand, may comprise a high contrast vesicular type film also exposed by light, developed by heat and cleared by light. The duplicate film strip may have a film speed considerably different than that of the master film strip from which initial image areas are reproduced or duplicated.

The master film strip 30 is processed in the microimage recorder 20 so that a completed film strip includes a sequence of linear arrays contained in discrete image areas which are separated by guard bands providing margins having indexing blips thereon for assisting in the control of the travel or movement of the master film strip along the processing path. Each image area may include an array of discrete images or frames which are set up in patterns of rows and columns. In a typical format, a large number of images or frames may be included in each image area and machine or human readable indicia may be provided at a convenient location to identify each of the image areas.

A pattern or array of images is exposed onto an image area of the master film strip at the exposure station 36 which includes an optics assembly generally designated by the reference numeral 58. The optics assembly comprises a lens 60 for focusing light images developed by the cathode ray tube 26 onto the master film strip 30 at the exposure station. A movable light shroud or enclosure 62 confines the light from the CRT to a desired region and precise position on the film strip. An X-Y positioner 64 moves the lens 60 in sequence to different positions in rows and columns with respect to the film strip to form an array of exposed images in each image area on the film. During the exposure of each image or frame, an aperture clamp 66 closes against a lens aperture block 68 to precisely position the master film strip in a proper plane for the exposure.

Initially, the master film strip moves from a spool 32 in the supply cartridge 33 around a roller 27 and past a first film clamp 98 in an advancing direction as indicated by the arrows A. From the first film clamp, the film strip continues around an idler roller 100 and passes an encoding roller 102 as more fully described in the copending U.S. patent application Ser. No. 787,812, previously referred to herein and incorporated by reference. After the film is exposed to images generated by the optics assembly 58, the film strip advances past a second film clamp 106 and around a movable dancer roller 108 which is mounted on the outer end of a dancer arm 122. The dancer arm is movable about a pivot axle 124 as biased by a spring 126 in order to provide increased tension on the master film strip to a level somewhat higher than the usual level of approximately five pounds which is normally provided by the motors driving takeup and supply spools 32 and 34.

The master film strip advances upwardly from the dancer roller 120 towards the master film developing station 38 and preferably this developing station is of the type disclosed in copending U.S. patent application Ser. No. 787,898, filed on Oct. 16, 1985, and incorporated herein by reference. At the master film developing station, the film strip moves over a pair of spaced apart support rollers 110 and 112 which provide support for the film at opposite edges of a previously exposed latent image area thereon which is to be developed by the application of heat. For this purpose, a developer shoe 70 having a heated, convexly curved contact surface is mounted on a pivot arm 76 rocked or pivoted back and forth by a shaft 75 to move the developer shoe into and out of heating contact with the segment of the master film strip positioned across the rollers 110 and 112. A heat shield 72 is provided to protect the master film from unwanted heat during movement of the film strip before and after the controlled heat development of an image area thereon. The heat shield is supported on a pivot axle 73 and is interconnected mechanically with the developer shoe to move between a heat shielding position and a retracted position as the developer shoe is moved between a remote position as shown in FIGS. 1 and 2 and a developing position in direct heating contact against the film strip. A backup member 80 is provided at the master film developing station 38 for insulating the underside of the master film strip during the heat developing process while the developer shoe is in direct contact with the film surface, and reference should be had to the detailed disclosure of the aforementioned copending U.S. patent application Ser. No. 787,898, for a more detailed description of the operating processes and structural apparatus of the master film developing station.

After the latent image areas on the master film strip 30 are developed, the film is advanced upwardly around a roller 114 and then moves downwardly along a sloping path leading to a duplication position at the duplication station 40. The master film remains in the duplication position while one or more duplicates of the developed image areas thereon are made. After a desired number of duplicates are produced from an image area on the master film, the film strip is advanced around a guide roller 116 and upwardly past a third film clamp 118 and guide roller 121 to be wound upon the takeup spool 34 driven by the takeup drive motor 96.

In general, the master film strip 30 moves from the supply cartridge 33 to the takeup reel 34 in a film advancing direction as indicated by the arrows A, however, if it is desired, the master film strip can be returned to the supply spool 32 in the cartridge 33 at any time, usually when a length of a master film strip has been fully exposed, developed and duplicated as desired.

The duplicate film strip 42 is fed from the duplicate film supply cartridge 128 by a pair of feed rollers 130 and moves around a dancer roller 134 mounted adjacent the outer end of dancer arm 154 supported for pivotal movement about a pivot axle 156. The duplicate film strip then passes upwardly from the dancer roller 136 around a roller 136 and downwardly to the duplication station 40 wherein a segment of the master film processing path and a segment of the duplicate film processing path converge and overlap to provide for a contact printing type duplication process wherein an image area on the master film strip 30 is duplicated on the duplicate film strip 42. During the exposure time in the duplication process, the respective film strips 30 and 42 are clamped tightly together (FIGS. 2, 3 and 6) against a glass platen or plate 93 provided on the underside of an exposure light housing 92. Clamping pressure is provided by a vacuum clamp and film transport assembly 82 which includes an endless, perforated belt 84 trained around an idler roller 86 at one end and a drive roller 88 at a lower opposite end. The duplicate film strip 42 is always firmly secured against the upper run of the vacuum belt 84 by a vacuum drawn from the underside of the movable belt and thus the duplicate film strip may be moved independently relative to the master film strip 30 in reversible, opposite directions as indicated by the arrows B.

Figure 5:
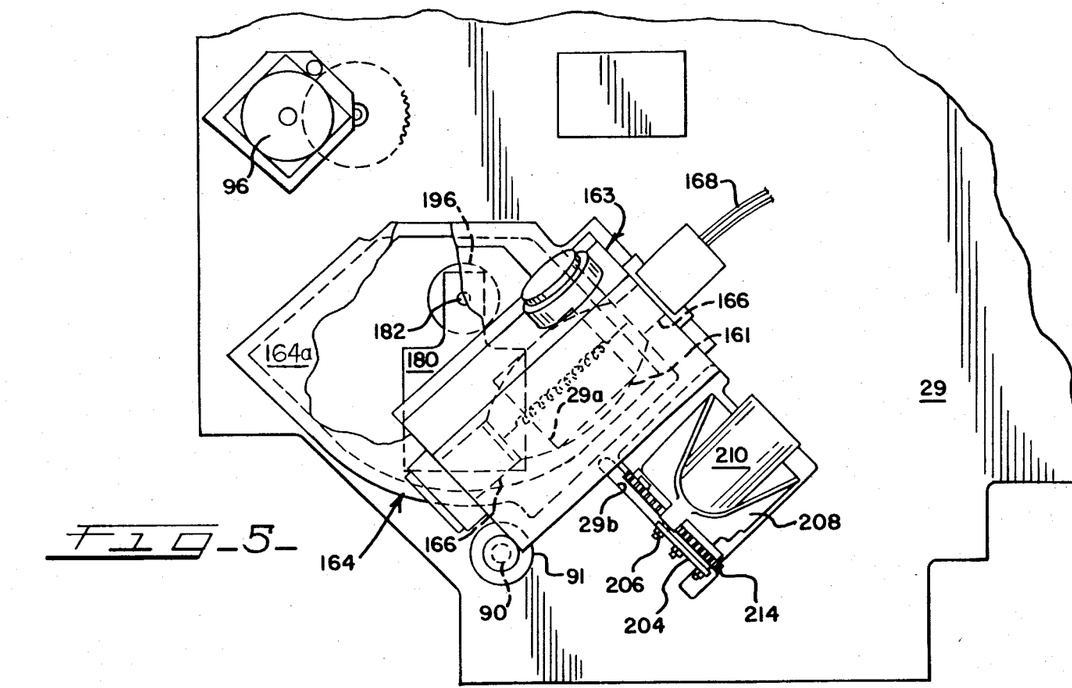
FIG. 5 is a rear elevational view of the film duplication system of the present invention.
Figure 6:
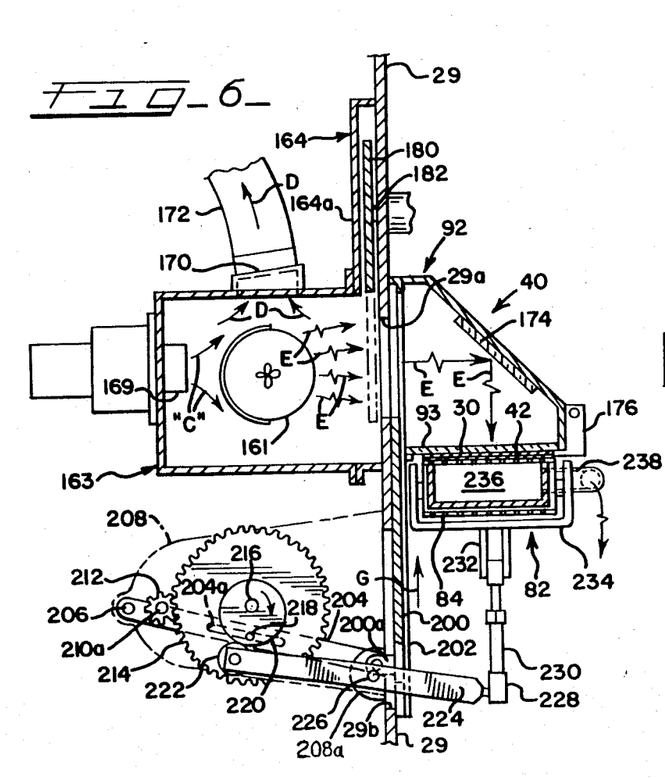
FIG. 6 is a fragmentary, transverse cross-sectional view taken substantially along lines 6—6 of FIG. 3.
Figure 7:
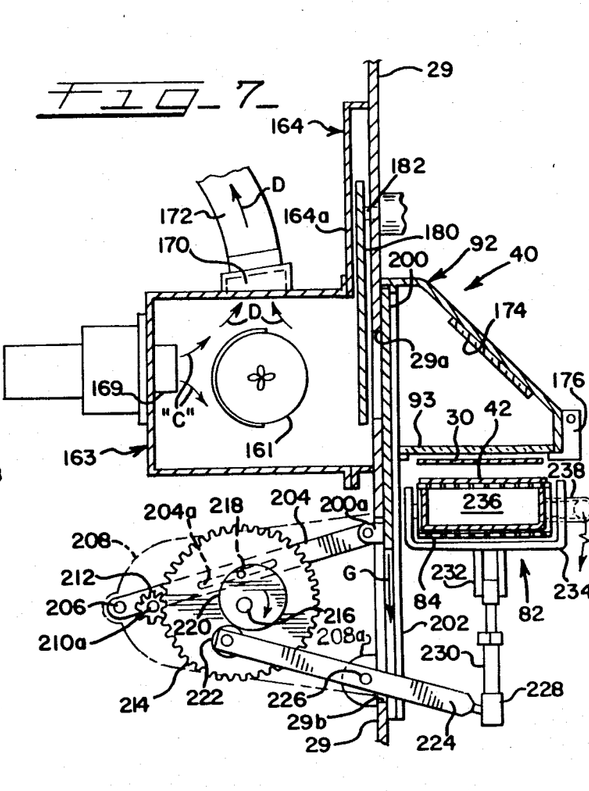
FIG. 7 is a cross-sectional view similar to FIG. 6 taken substantially along lines 7—7 of FIG. 4.

The drive roller 88 is mounted on a drive shaft 90 which projects transversely through the chassis plate 29 and is coupled to a reversible, DC powered drive motor 91 mounted on the rear face of the chassis as shown in FIG. 5. The vacuum clamp assembly 82 is pivotally movable around the axis of the drive shaft 90 between a film clamping position as shown in FIGS. 2, 3 and 6 for duplicating an image area on the master film 30 onto the duplicate film strip 42 and a lower, non-clamping, separate position as shown in FIGS. 1, 4 and 7 wherein the previously merged segments of the respective master film and duplicate film processing paths are spaced apart and separated from one another. The duplicate film stip 42 can be moved to advance or in a reverse direction as driven by the endless vacuum belt 84 while a particular image area on the master film strip 30 remains in a duplication position without moving. A selected image area on the master film strip may be duplicated successively any number of times on the duplicate film strip by advancement of the duplicate film strip after each exposure cycle while the master film strip is stationary.

After an image area is exposed onto the duplicate film strip 42, the film strip is advanced outwardly past the rollers 116, 88 and a roller 138 to the cutting station 44 wherein a cutting knife assembly 140 is activated to sever the duplicate film strip into discrete record segments or microfiche cards 24. The cards are fed by a pair of feed rollers 142 and 144 to a duplicate film developing station 46 wherein the latent image area on each individual microfiche or record card 24 is developed by the application of heat from a rotating heated drum 146. The individual microfiche or record cards 24 are biased against the surface of the heated drum by an endless pressure belt 148 and the developed microfiche cards then pass from the developing station 46 between a pair of endless feed belts 150 and 152 to the exit port 22. A clearing station 48 is associated with the exit port and includes a clearing lamp 159 which provides film clearing, light radiation directed onto each of the developed microfiche records or cards 24 as the card is discharged from the belt feeders 150 and 152 into a tray at the exit port 22.

Referring now more particularly to FIGS. 2 through 7, in accordance with the features of the present invention, the duplication station 40 includes an electric exposure lamp 161 which is capable of providing several different levels of illumination depending upon the power supplied thereto. The exposure lamp is mounted in a light tight lamp housing or enclosure 163 detachably secured to a rear face of a shutter enclosure 164 mounted on the back face of the chassis wall 29. A portion of the shutter housing is positioned directly opposite the light housing 92 mounted on the forward face of the chassis as best shown in FIGS. 6 and 7. The electric lamp 161 is removably mounted within the lamp housing 163 and is supported at opposite ends in sockets 166 mounted on the end walls of the enclosure. The lamp and enclosure may be removed from the shutter housing as a unit for servicing and or replacement of the lamp. Power for illuminating the filaments of the lamp 161 is supplied through electrical cables 168 and the level of power provided and the time of an exposure interval is closely controlled and selected to provide the desired amount of light intensity for exposing and forming a duplicate image area on the duplicate film strip 42 from the image area in contact therewith on the master film strip 30 at the duplication station.

As illustrated in FIGS. 5, 6 and 7, because of the relatively high power settings and heat developed by the lamp 161, cooling air flows into the housing through a suitable inlet 169 as indicated schematically by the arrows C and heated air is exhausted from the lamp enclosure 163 through exhaust outlet 170 in an upper wall thereof via an exhaust hose 172 as indicated by the arrows D (FIGS. 6 and 7).

When the lamp 161 is energized to provide light for exposing image areas onto the duplicate film strip 42, controlled intensity light travels as indicated by the arrows E (FIG. 6) through an open, rectangular shaped shutter aperture 29a that is formed in the vertical chassis wall 29 directly between the light enclosure 92 and the shutter compartment 164. The light generated by the illuminated lamp 161 strikes a mirror 174 mounted on a sloping upper wall portion of the light housing 92 as shown in FIG. 6, and is reflected downwardly through a clear glass platen 93 forming a bottom wall of the housing to expose a duplicate image area on the duplicate film strip 42 that is clamped directly beneath a developed image area on the master film strip 30 in place at the duplication station. The platen 93 is removably mounted in the light housing structure 92 and can be taken out for cleaning and replacement by releasing a clip mechanism 176 along an outer lower edge portion of the housing as shown in FIGS. 2, 6 and 7.

In accordance with an important feature of the present invention, the flow of light from the lamp 161 through the aperture 29a is closely and accurately controlled by a relatively fast moving swinging shutter 180 which is mounted in the shutter housing 164 on the rear face of the chassis 29. The swinging shutter is supported for pivotal movement by a shutter shaft 182 and is movable between an open position and a closed position wherein the shutter is positioned directly in front of the aperture 29a for blocking the flow of light from the lamp 161 through the aperture. The shaft 182 which supports the swinging shutter 180 is mounted for rocking movement on a bearing structure 184 carried on the front of the chassis 29 as indicated generally in FIG. 2.

The swinging shutter 180 is adapted to rest in either a fully closed position or a fully open position and an over-center spring 201 (FIG. 9) is provided to retain the shutter against either one of a pair of bumper stops 203L or 203R mounted on divergent edge walls 164b and 164c of the shutter housing 164. An upper end of the spring 201 is connected to a fixed pin 205 mounted on the back wall 164a of the shutter housing and the lower end of the spring is connected to a short pin 180a mounted on the shutter itself. As the shutter swings in either direction and the pin 180a passes a dead center position directly below the shutter shaft 182 toward one side or the other, the spring 201 becomes effective to bias and hold the shutter against one of the bumper stops 203L or 203R.

The bumper stops are mounted on stop arms 207 which in turn are pivotally mounted on the chassis wall 29. The stops and arms serve as shock absorbers to arrest the movement of the shutter 180 at the end of each swinging stroke toward the open or closed position. As indicated in FIG. 9, each bumper stop is provided with a backup stop retainer assembly 209 and together the bumper stops 203, stop arms 207 and stop retainers 209 provide smooth deceleration of the shutter at the end of each operative stroke or shutter swing.

Figure 8:
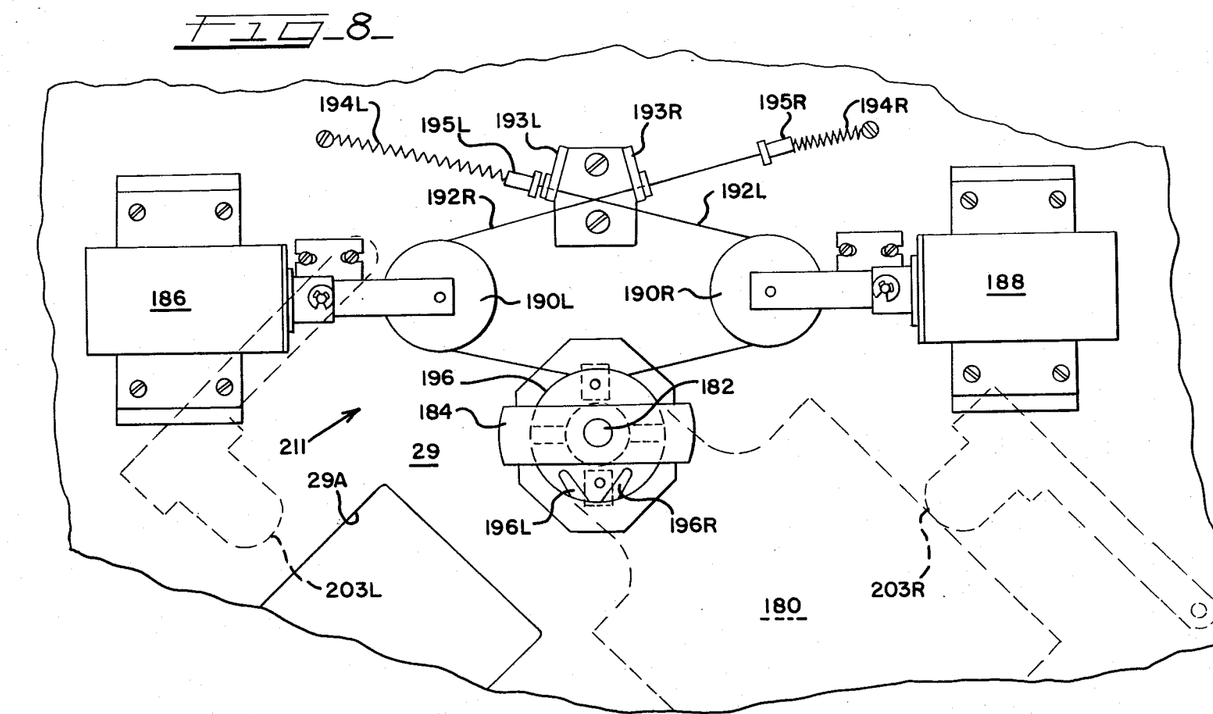
FIG. 8 is an enlarged front elevational view of a shutter control mechanism in accordance with the present invention.
Figure 9:
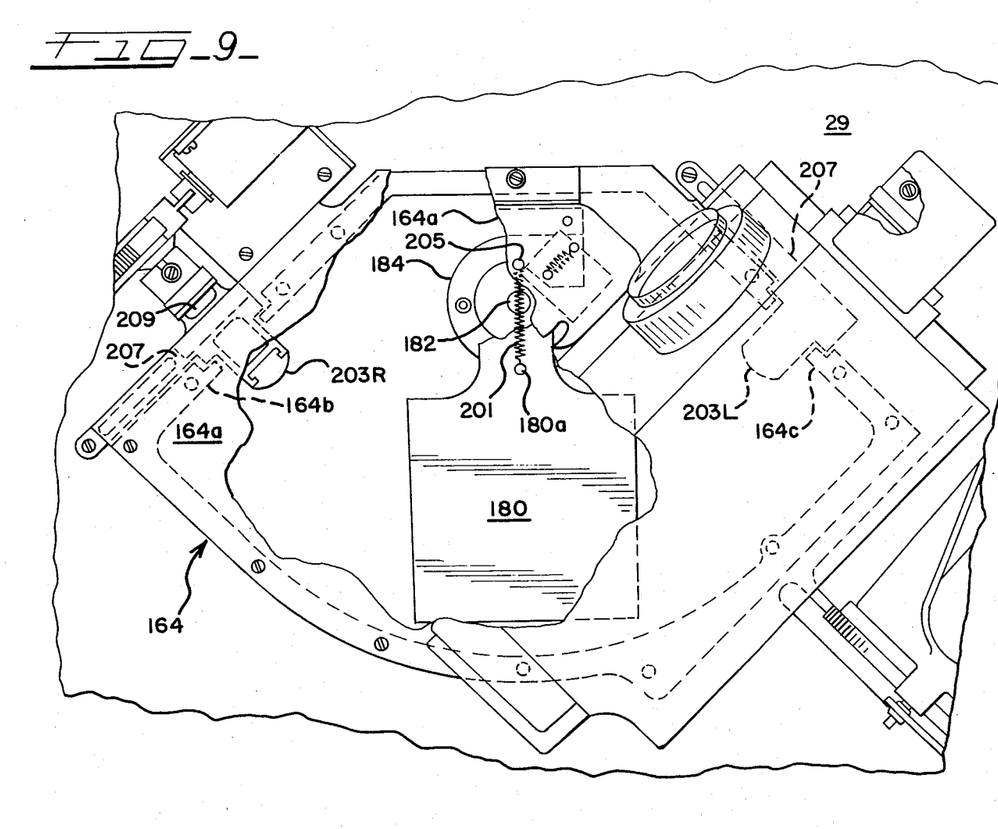
FIG. 9 is an enlarged rear elevational view of the shutter mechanism with portions broken away for clarity.

Control of the swinging shutter to open and close the aperture 29a as described is initiated and controlled by a shutter control mechanism 211 (FIG. 8) which includes a left hand shutter opening solenoid 186 and a right hand, shutter-closing solenoid 188, both of which are mounted on the front face of the chassis wall 29 on opposite sides and above the level of the shutter shaft 182 as shown in FIGS. 2 and 9. The shutter shaft is supported for rocking motion to swing the shutter back and forth between open and closed positions on the bearing structure 184 and a drum 196 is mounted on the shutter shaft to rotate the shaft in opposite directions. When the drum is rotated in a clockwise direction, the shutter 180 swings from the open position (FIG. 8) resting against the stop 203R (FIG. 9) to the closed position wherein an opposite edge of the shutter is engaged against the bumper stop 203L. Conversely, when the drum 196 rotates in a counterclockwise direction, the shutter 180 swings from the closed position past dead center (FIG. 9) and returns to the open position wherein an edge rests against the bumper stop 203R. The shutter is retained in either the open or the closed position by the force of the over-center bias spring 201.

In order to rotate the drum 196 in opposite directions as described, the shutter control mechanism 211 includes a pair of flexible cords 192L and 192R each connected at a lower end to the drum and secured within respective slots 196L and 196R, provided in the drum. From the lower slot 196L, the cord 192L passes around a left hand grooved portion in the drum 196 in a clockwise direction and then is trained around a grooved right hand edge portion of a pulley wheel 190R. The wheel 190R is mounted on an outer end portion of a pull-in type armature of the shutter closing solenoid 188. The line 192L continues upwardly and to the left from the pulley wheel 190R and passes through an aperture provided in a cable guide element 193L for attachment to a cord stop 195L as shown in FIG. 8. The stop 195L is attached to one end of a tension spring 194L and the spring has an opposite end fixedly secured to the chassis wall 29 by a fastener as shown. Similarly, a cord 192R extends upwardly from the slot 196R in the drum around a right hand portion of the drum in a counterclockwise direction and passes around a grooved left hand edge portion of a pulley wheel 190L on the pull-in type armature of the shutter opening solenoid 186. The cord 192R then passes upwardly and towards the right through an aperture provided in the cable guide element 193R and is attached to a stop 195R connected to one end of a spring 194R. The opposite or outer end of the spring is fixedly secured to the chassis plate 29 with a suitable fastener as shown. At the beginning of an operating cycle, both solenoids 186 and 188 are in a deenergized state, and assuming that the shutter 180 in the open position (FIG. 8), the tension spring 194L is extended and the stop 195L is closely adjacent the cable guide element 193L as shown. Subsequently, when the shutter closing solenoid 188 is energized, the armature thereof is pulled in (towards the right) and this action moves the stop 195L firmly against the guide element 193L providing a solid reaction point for the cable 192L to work against. Movement, of the pulley 190R towards the right exerts a clockwise moment on the drum 196 through the cable 192L causing the shutter 180 to swing or pivot in a clockwise direction from the open to the closed position wherein the left hand edge of the shutter (FIG. 8) is seated against the bumper stop 203C (FIG. 9).

As clockwise rotation of the drum 196 occurs, tension is exerted on the cord 192R causing the cord stop 195R to move downwardly and toward the left to finally engage the cable guide element 193R while extending the spring 194R from a contracted condition as shown to an extended condition like that of the opposite spring 194L as shown in FIG. 8. Subsequently, when the shutter-closing solenoid 188 is deenergized, the spring 194L contracts in length, pulling the armature of the solenoid outwardly and the pulley 190R moves to the normal outward position as shown in FIG. 8.

When the shutter opening solenoid 186 is energized to pull the the armature inwardly and move the pulley 190L to the left, the stop 195R firmly engages the guide element 193R and provides a solid anchor point for the cord 192R permitting no further movement of the upper end portion of the cord. The cord thus exerts a counterclockwise moment on the drum 196 and the shutter 180 swings to the open position wherein the right edge (FIG. 8) again rests against the stop 203R. Because the right hand pulley 190R of the deenergized solenoid 188 is already in the fully outwardly extended position on the armature, the left hand cord 192L exerts tension on the left hand spring 194L causing the spring to extend from a contracted position to the fully extended condition of FIG. 8 wherein the stop 195L is closely adjacent the left hand cable guide 193L as illustrated. Subsequent deenergization of the solenoid 186 permits the tension spring 194R to contract and pull the left hand pulley 190L outwardly by pulling through the cord 192R.

From the foregoing, it will be understood that the system 211 permits the armatures of the respective solenoids 186 and 188 to always return to the fully extended outward positions as shown when niether solenoid is being energized. One of the springs 192L or 192R is extended in this condition so that whichever of the two solenoids is energized, the energized solenoid only has to swing the shutter 180 and does not have to simultaneously stretch or extend the extended one of the springs 192L and 192R. Speed of shutter movement between the open and closed positions is thus maximized.

In accordance with a feature of the present invention, the lamp 161 is maintained at a relatively low power level, for example 250 watts, as the shutter swings between the closed position and the open position. Both shutter traverses are made at reduced lamp intensity so that illumination gradients on the film are minimized. As viewed in FIGS. 3 and 4, the left hand portion of each image area 50 will inherently receive more lights, due to the opening swing of the shutter from left to right and the closing swing from right to left. By making both traverses of the shutter from open to closed and from closed to open at reduced levels of illumination, the difference in illumination exposure as a percentage of the total illumination is minimized. When the shutter is fully open, the lamp 161 is energized at a higher level, for example 500 watts, until the exposure cycle times out.

In accordance with an important feature of the present invention, the duplication station 40 is also provided with a second, safety shutter 200 mounted on the opposite or forward face of the chassis 29 to slide within a pair of parallel upwardly sloping side frame members 202 which guide the reciprocal sliding movement of the safety shutter between an upper, aperture closing position (FIGS. 4 and 7) and a downward, shutter opening position illustrated in FIGS. 3 and 6. As illustrated in FIGS. 2, 3 and 4, the shutter guides or tracks 202 are mounted on opposite sides of the aperture 29a and slope downwardly and leftwardly of the aperture for guiding reciprocal movement of the safety shutter between the open and closed positions in a direction indicated by the arrow G.

The sliding safety shutter 200 prevents inadvertent exposure and/or double exposures of the master and duplicate film strips during movement of the film in advancing or reversing directions and, in addition, the safety shutter 200 permits servicing of the swinging shutter 180 and the lamp 161 and removal of the lamp enclosure 163 from the rear section of the housing 28 without having to remove the film strips in the apparatus in the front section of the housing on the other side of the vertical chassis 29. Removal of the lamp enclosure 163 and the swinging shutter housing 164 can be accomplished without fear that film present on the vacuum clamp 82 above the vacuum belt 84 will be exposed in an unwanted fashion. Undeveloped portions of the master film strip 30 are retracked back into the light-tight cartridge 33 prior to opening of the doors on the cabinet, however, the duplicate film strip 42 can be left in room light for a limited time due to a relatively slow film speed. However, an extended period of time of exposure will require that the portion of the duplicate film strip so exposed be discarded without imaging because the active images get cleared off the film.

The sliding shutter 200 is driven to reciprocate within the side guides 202 by a drive arm 204 pivotally connected to a rearwardly extending shutter bracket 200a projecting through a slotted portion 29b formed in the chassis wall as best shown in FIGS. 6 and 7. A rearward end of the drive arm 204 is pivotally secured on a pivot pin 206 spaced outwardly from the rearward face of the chassis 29 and supported in a motor bracket 208 detachably mounted on the rear face of the chassis.

A DC motor 210 for supplying power for reciprocating the shutter 200 and for operating the vacuum clamp assembly 82 in synchronism therewith is supported by the motor bracket 208, and the motor includes an output shaft 210a which drives a pinion 212 in meshing engagement with a larger diameter, driven gear 214. The gear is mounted for rotation at a reduced speed on a gear shaft 216 journalled in bearings carried by the motor bracket 208 and the shaft extends parallel of the motor shaft 210a as shown in FIGS. 6 and 7. An eccentric crank pin 218 extending outwardly from one face of the gear 214 is drivingly engaged with the arm 204 in an elongated slot 204a extending longitudinally of the body of the arm and intermediate the ends. As the eccentric crank pin rotates about the axis of the gear shaft 216, the shutter drive arm 204 is pivoted to rock back and forth between a lower position (FIG. 6) wherein the shutter 200 is in an open position and an upper position (FIG. 7) wherein the shutter is in a closed position covering the aperture 29a.

The DC motor 210 also provides driving power through the gear 214 for synchronizing movements of the vacuum clamp assembly 82 between an upper, film clamping position (FIGS. 2, 3 and 6) and a lower retracted position wherein the duplicate film strip 42 is separated from contact with the master film strip 30 as illustrated in FIGS. 4 and 7. The gear 214 is provided with an eccentric, generally circular cam 220 on a face opposite the crank pin 218 and the cam engages a cam follower roller 222 mounted on the rearward end of a drive arm 224, for controlling the position of the vacuum clamp assembly 82. The drive arm 224 is pivotally supported intermediate its ends for rocking movement on a pin 226 carried on a bracket 208a. The arm 224 extends forwardly through the wall slot 29b and is connected to a universal joint 228 joined to a link member 230 of adjustable length pivotally connected at the upper end to a clevis 232 depending downwardly from the underside of the vacuum clamp assembly 82 as shown best in FIGS. 2, 3, 4, 6 and 7.

The vacuum clamp assembly 82 serves to clamp and hold the duplicate film strip 42 tightly against the surface of the upper run of the perforated vacuum belt 84 so that the film strip will move therewith and may be indexed in either direction as shown by the arrows B to position a particular segment thereof in position for imaging as previously described. In addition, the vacuum clamp assembly serves as a clamp for biasing the duplicate film strip against the master film strip and both film strips together tightly against the glass platen 93 so that a true and accurate image area can be exposed and duplicated on the duplicate film strip when exposed to light from the lamp 161 passed through a developed image area on the master film strip as previously described.

The vacuum clamp assembly includes a channel-shaped outer body 234 with the clevis 232 attached to the underside thereof and the body is mounted for pivotal movement at a lower end on the pivot shaft 90 which drives the lower belt drive roller 88. At the upper end, the outer body supports a shaft for the idler roller 86 and between the upper and lower runs of the endless, perforated belt 84 there is provided a central vacuum chamber 236 having a bottom wall, a pair of upstanding sidewalls and a pair of opposite end walls which form an open upper end closed off by the upper run of the perforated vacuum belt 84. A vacuum is drawn in the chamber 236 through an outlet fitting 238 projecting outwardly from an outer sidewall through a vacuum hose 240 of flexible construction connected to a vacuum pump or fan (not shown). When suction is provided on the vacuum hose, the duplicate film strip 42 is clamped tightly against the upper run of the perforated vacuum belt 42 and is held against the belt for movement therewith in either direction as indicated by the double headed arrow B. The direction of belt movement is determined by the direction of rotation of the shaft 90 driven by the drive motor 91 which is a DC powered bi-directional motor.

The drive motor 91 is energized to rotate in one direction for advancing the duplicate film strip 42 in successive steps after each duplicate microfiche record of an image area 50 is exposed. Any number of duplicates can be made from a single image area on the master film strip 30. After a final step of advancement, the exposed image area on the duplicate film strip reaches a null position with the leading edge of the strip at the cutting station 44. The duplicate film strip is advanced an additional step so that the exposed image area passes by the knife mechanism 140 into a position for cutting thereby to provide an individual microfiche record 24. Prior to cutting and development of the exposed image as a microfiche record 24, a delay period is provided equivalent to the time required for each duplication of multiple image areas from a single master film image area in order that consistent delay time and image quality are obtained. After the delay period, the exposed image area of the duplicate film is cut, developed and cleared.

More specifically, when multiple microfiche records 24 are made from a single developed image area 50 of the master film strip 30 at the duplication station 40, the master film strip 30 is not advanced and exposure and master film developing operations are not carried out between successive operations of the duplication station 40. A first image area is exposed on the duplicate film strip 42 at the duplication station, and the duplicate film strip is advanced to the position shown in FIG. 1 with the leading edge at the cutting station 44. While the first latent or undeveloped image area at the leading end of the duplicate film strip 42 is at this null position between the duplication station and the cutting station 44, the duplication station 40 is operated again to duplicate a second copy of the same image area 50 from the master film strip 30 onto the next adjacent region of the duplicate film strip 42. After the second exposure, the duplicate film strip is advanced one step to move the first exposed image area past the knife member 140 of the cutting station 44. This first exposed image area is severed from the end of strip 42, and is developed and cleared to provide a completed microfiche record 24. This sequence of operation is repeated without movement of the master film strip 30 until the desired multiple number of records are duplicated.

The time required between operations of the duplication station 40 is longer when the master film strip 30 is advanced and processed at the exposure station 36 and developing station 38 between operations of the duplication station 40. The image quality of exposed image areas on the duplicate film 42 is affected by the delay between exposure and development of the duplicate film 42. Consistent image quality is obtained by controlling the duplicate film travel to prevent extended delay as the master film strip 30 is advanced and processed.

When single microfiche records 24 are made from each image area 50 of the master film strip 30, or when the last of a number of multiple records has been made, the duplicate film strip 42 is advanced one step following the duplication operation to place the exposed image area on the duplicate film strip 42 at the null position with the leading edge at the cutting station 44. The duplicate film strip is then advanced an additional step so that the exposed image has passed the cutting station and the exposed image area is properly positioned to be cut from the end of strip 42. Prior to cutting and development of the exposed image as a microfiche record 24, a delay period is provided equivalent to the time required for each duplication of multiple image areas from a single master film image area in order that consistent delay time and image quality are obtained. After the delay period, the exposed image area of the duplicate film is cut, developed and cleared.

When the exposed image is cut, an unexposed area resides in the null position of the duplicate film path between the duplication station 40 and the cutting station 44. Wastage of this unexposed area is avoided by reversing the travel of the duplicate film strip to retract the unexposed leading end of the duplicate film strip into the duplication station 40. The drive motor 91 is energized to rotate the shaft 90 in a reverse direction and the vacuum belt 84 is moved in the reverse direction to retract the duplicate film strip one step.

The dancer roller 134 is mounted on an arm 154 pivoted at axis 156. The weight of the arm 154 causes the dancer roller 134 to take up slack in the duplicate film strip 42 when it is retracted. A pair of detectors in the form of switches 160 and 162 detect alternate extreme positions of the arm 154 and dancer roller 134. If duplicate film strip tension is lost as by breakage of the film strip 42, the arm 154 moves against switch 162 to provide a signal indicating a film break. Switch 160 controls the duplicate film strip drive rollers 130 to feed additional film strip 42 into the duplicate film strip path upon demand.

It should be noted that the drive motor 210 is a unidirectional DC motor and rotates the gear 214 only in one direction. This gear drives both the interconnected shutter drive arm 204 and the vacuum drive arm 224, respectively, to rock back and forth to provide synchronized, reciprocal bi-directional movement of the safety shutter 200 and the vacuum clamp assembly 82. The unique drive mechanism which is powered from a single uni-directional power source insures that when the safety shutter 200 is in a closed position, the vacuum clamp assembly 82 is in an unclamped downward position, and that alternatively, when the safety shutter is in an open position, the vacuum clamp assembly is in a film clamping position ready for creating a duplicate image area on the duplicate film strip 42 in the duplicating position at the duplicating station 40.

Should servicing of the swing shutter 180 or the exposure lamp 161 be required, the drive motor 210 is energized, if necessary, to move the safety shutter 200 upwardly to the closed position and simultaneously as this occurs the vacuum clamp assembly 82 is released downwardly to the nonclamping position so that the master film strip 30 and the duplicate film strip 42 may be moved and transported independently of one another by the respective film transporting systems.

A typical operating sequence of the duplicator station 40 takes place as follows as more fully described in the copending U.S. patent application Ser. No. 893,750, filed Aug. 6, 1986. A machine control unit (MCU) performs the following operations including energizing a latch solenoid for the duplicate film dancer roller 134, reversing the drive motor 91 one full cycle to retract the duplicate film strip 42, clamping the master film strip 30 and the duplicate film strip 42 against the platen 93 which opens the sliding shutter 200, opening the swinging shutter 180, waiting for a swinging shutter 180 open signal and simultaneously starting a vibration timer and starting an exposure timer. The duplication lamp 161 is energized by operating a pair of relays at a high power level, for example 500 watts to provide a high light intensity output. After a predetermined exposure time period, the duplication lamp 161 is provided with the normal maintenance power level, for example 250 watts, and the swinging shutter 200 is closed a predetermined time thereafter allowing the lamp 161 to dim to the low light level. When a sensor provides a signal that the shutter 200 is closed, the master film 30 and duplicate film 42 are unclamped from the platen 93. The duplicate film strip 42 is advanced one step and the duplicate film dancer latch solenoid is deenergized. After a predetermined time delay the duplicate fiche is cut by activating the knife member 140 to form the individual microfiche 24. The MCU repeats the sequential duplication steps until all duplicates for the current master fiche on an image area of the master film strip 30 in the duplication position are produced.

Although the invention has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

We claim:

1. In a microimage recording apparatus of the type utilizing an elongated master film strip movable along a master film processing path, a film duplication system for making a duplicate film strip from successive developed image areas on said master film strip, said duplication station comprising:

means for moving a developed image area on said master film strip into and out of a duplication position along said master film strip path for making a duplicate of said image area on said duplicate film strip;

means for moving a segment of said duplicate film strip along a duplicate film processing path and moving said segment into contact against said master film strip at said duplication position, said means for moving said duplicate film strip comprising vacuum belt means having a belt run in vacuum holding contact with said duplicate film strip at said duplication position and movable toward and away from said master film strip at said duplication position; and means for exposing said duplicate film strip at said duplication position to light passed through said image area on said master film strip for creating a latent duplicate image area on said segment of said duplicate film strip in contact with said master film strip at said duplication position.

2. The film duplication system of claim 1 including means for driving said vacuum belt means to move said run in opposite directions to move a segment of said duplicate film strip into and out of said duplication position.

3. The film duplication system of claim 1 wherein said vacuum belt means includes an endless perforated belt and means for drawing a vacuum on one side of said belt run of said belt to draw said duplicate film strip into contact with said belt for movement therewith.

4. The film duplication system of claim 3 wherein said vacuum belt means includes belt rollers at opposite ends of said run and drive means for rotating one of said rollers in opposite directions to move said belt along said run.

5. The film duplication system of claim 4 including means for pivoting said vacuum belt means about one of said belt rollers to move said belt run toward and away from said master film strip at said duplication position.

6. In a microimage recording apparatus of the type utilizing an elongated master film strip movable along a master film processing path, a film duplication system for making a duplicate film strip from successive developed image areas on said master film strip, said duplication station comprising:
means for moving a developed image area on said master film strip into and out of a duplication position along said master film strip path for making a duplicate of said image area on said duplicate film strip;
means for moving a segment of said duplicate film strip along a duplicate film processing path movable between a first position for biasing said duplicate film strip into contact against said master film strip toward said platen and a second position spaced apart from said master film strip for permitting movement of said duplicate film strip independently of said master film strip along said duplicate film processing path; and
means for exposing said duplicate film strip at said duplication position to light passed through said image area on said master film strip for creating a latent duplicate image area on said segment of said duplicate film strip in contact with said master film strip at said duplication position, said exposing means including a platen supporting one surface of said master film strip at said duplication position for transmitting light through said image area thereof to form said latent duplicate image area on said segment of said duplicate film strip in contact with an opposite surface of said master film strip.

7. The film duplication system of claim 6 wherein said means for moving said master film strip includes means for indexing successive image areas thereon in said duplication position supported against said platen.

8. The film duplication system of claim 6 wherein said exposing means includes a light source and a light aperture between said source and said platen, and shutter means for opening and closing said aperture to control the light from said light source through said platen and image area on said master film strip for producing said duplicate latent image area on said segment of said duplicate film strip in contact therewith.

9. The film duplication system of claim 8 wherein said shutter means includes a safety shutter movable to open and close said aperture and a second shutter movable independently of said safety shutter to open and close said aperture.

10. The film duplication system of claim 9 wherein said aperture is formed in a wall and said master film strip and duplicate film strip are positioned on one side of said wall and said light source is positioned on an opposite side of said wall.

11. The film duplication system of claim 10 wherein said safety shutter is mounted on said one side of said wall and said second shutter is mounted on said opposite side of said wall.

12. The film duplication system of claim 9 wherein said exposing means includes a shutter housing on said opposite side of said wall for enclosing said second shutter and a lamp enclosure in communication with said shutter housing for supporting said light source.

13. The film duplication system of claim 9 wherein said second shutter comprises a shutter supported on a shaft for rotation back and forth between said open and said closed position, and shutter operating means for driving said shaft alternately in opposite directions to swing said shutter to open and close.

14. The film duplication system of claim 13 wherein said shutter operating means includes a pair of flexible cords, each cord having one end connected to rotate said shaft in a direction opposite to that of the other and an opposite end resiliently secured from said wall, and a pair of pulleys, each engaged by one of said cords and mounted on the armature of one of a pair of solenoids for movement inwardly when said solenoids are alternately energized momentarily to pull said cords in opposite directions to swing said second shutter between said open and closed positions.

15. The film duplication system of claim 14 including a drum on said shutter shaft having an outer surface having opposite sides engaged by one of said flexible cords and an end of each cord being secured to said drum.

16. The film duplication system of claim 9 wherein said safety shutter is mounted for reciprocal sliding movement on said one side of said wall between said open and closed position and including shutter drive means independent of said second shutter for moving said safety shutter to open and close.

17. The film duplication system of claim 16 wherein said means for moving said duplicate film strip includes vacuum belt means movable between a film clamping position biasing said duplicate film strip against said master film strip toward said platen for duplication of said image area and a non-clamping position wherein said duplicate film strip is spaced apart from said master film strip for indexing a segment thereof into and out of a duplication position.

18. The film duplication system of claim 17 wherein said shutter drive means includes means for moving said vacuum belt means in synchronism with said safety shutter so that said vacuum belt means is in said film clamping position when said safety shutter is open and said safety shutter is closed when said vacuum belt means is in said non-clamping position for indexing said duplicate film strip.

19. A microimage recorder for recording computer generated images on successive image areas of a master film strip and making dupicate image areas thereof on a duplicate film strip, comprising:
means for creating and developing successive image areas on said master film strip movable along a master film strip processing path to a duplication position;

a duplication system for indexing segments on a duplicate film strip along a duplicate film strip processing path movable into and out of contact with said master film strip at said duplication position;

means for exposing one or more successive segments on said duplicate film strip to light passed through said image area on said master film strip in said duplication position in contact with said duplicate film strip segments; and housing means having a chassis wall forming separate sections in said housing with an aperture formed in said wall for passing light toward said image area on said master film strip at said duplication position in one of said sections, said exposing means including a light source mounted in another of said sections intermittently energized to direct light through said aperture and including shutter means mounted adjacent a face of said wall for opening and closing said aperture.

20. The microimage recorder of claim 19 wherein said master film strip and said duplicate film strip are contained in said one section, and wherein said shutter means includes a first shutter mounted on a first side of said wall and a second shutter mounted on a second side of said wall.

21. The microimage recorder of claim 20 wherein said exposing means includes a light housing for directing light received from said light source through said aperture toward a platen in contact with an image area on said master film strip.

22. The microimage recorder of claim 21 wherein said duplication system includes a vacuum belt clamp assembly for indexing segments of said duplicate film strip into and out of said duplication position and movable between a film clamping position biasing said duplicate film strip into contact with said image area on said master film strip toward said platen and a non-clamping position wherein said duplicate film strip is spaced apart from said master film strip for indexing segments thereof independently of said master film strip.

23. The microimage recorder of claim 22 wherein one of said shutters comprises a safety shutter and including a common drive means for moving said safety shutter and said vacuum belt means in synchronism whereby said safety shutter is closed when said vacuum belt means is in said non-clamping position and said safety shutter is opened when said vacuum belt means is in said film clamping position.

24. The microimage recorder of claim 20 wherein said master film strip and said duplicate film strip are sloping along said contacting film paths at said duplication position and said aperture is spaced above said sloping paths with a lower edge is parallel therewith and wherein at least one of said shutters comprises a swing shutter supported on a rotatable shaft for swinging movement in opposite directions between an aperture closed position and an open position sloping outwardly away from said aperture.

25. The microimage recorder of claim 24 wherein said light source is energizable at several different levels of light intensity and is energized at a lower level when said swing shutter is between said positions and at a higher level when said swing shutter is open.

26. The film duplication system of claim 24 wherein said shaft is positioned above said swing shutter ans said swing shutter slopes downwardly of said shaft in one direction when open and slopes downwardly of said shaft in an opposite direction when closed.

27. The film duplication system of claim 26 including a pair of spaced apart bumper stops for engaging said swing shutter in said respective open and closed positions, and spring means for biasing said swing shutter against said stops.

28. The film duplication systemof claim 27 wherein said spring means comprises a tension spring having an upper end connected to a fixed point above said shaft and a lower end connected to said swing shutter below said shaft whereby said spring biases said swing shutter toward one of said bumper stops in the direction of movement of said swing shutter past a dead center position wherein said upper and lower ends of said spring and said shaft are in alignment.

29. The film duplication system of claim 27 wherein said swing shutter includes opposite side edges and said bumper stops are positioned to engage respective side edges of said swing shutter at the endof a swinging stroke of said swing shutter between said open and closed positions.

30. In a microimage recording apparatus of the type utilizing an elongated master film strip movable along a master film processing path, a film duplication system for making a duplicate film strip from successive developed image area on said master film strip, said duplication station comprising:

means for moving a developed image area on said master film strip into and out of a duplication position along said master film strip path for making a duplicate of said image area on said duplicate film strip;

means for moving a segment of said duplicate film strip along a duplicat film processing path and moving said segment into and out of contact against said master film strip at said duplication position; and means for exposing said duplicate film strip at said duplication position tolight passed through said image area on said master film strip for creating a latent duplicate image are an said segment of said duplicate film strip in contact with said master film strip at said duplication position, said exposing means including a platen for supporting said master film strip in said duplication position, a light source, a light passing aperture between said light source and said film strip in said duplicaiton position and shutter means for opening and closing said aperture to control the light from said light source through said platen and image area on said master film strip for producing said duplicate latent image area on said segment of said duplicate film strip in contact therewith.

31. The film duplication system of claim 30 wherein said shutter means includes a safety shutter movable to open and close said aperture and a second shutter movable independently of said safety shutter to open and close said aperture.

32. The film duplication system of claim 31 wherein said aperture is formed in a wall and said master film strip and duplicate film strip are positioned on one side of said wall and said light source is positioned on an opposite side of said wall.

33. The film duplication system of system of claim 32 wherein and said second shutter is mounted on said opposite side of said wall.

34. The film duplication system of claim 32 wherein said exposing means includes a shutter housing on said opposite side of said wall for enclosing said second shutter and a lamp enclosure in communication with said shutter housing for supporting said light source.

* * * * *

UNITED STATES PATENT AND TRADEMARK OFFICE
CERTIFICATE OF CORRECTION

PATENT NO. : 4,626,099
DATED : December 2, 1986
INVENTOR(S) : Robert D. Zuelke, et al.

It is certified that error appears in the above-identified patent and that said Letters Patent are hereby corrected as shown below:

Column 4, line 21, delete "merged" and substitute therefor --merge--.

Column 5, lines 56 and 57, delete "devloper" and substitute therefor --developer--.

Column 6, line 19, delete "136" and substitute therefor --134--.

Column 6, line 54, delete "stip" and substitute therefor --strip--.

Column 8, line 20, delete "oi" and substitute therefor --of--.

Column 9, line 26, after "180" insert --is--.

Column 10, line 6, delete "niether" and substitute therefor --neither--.

Column 16, line 65, delete "dupicate" and substitute therefor --duplicate--.

Column 17, line 65, delete "ans" and substitute therefor --and--.

Column 18, line 6, delete "systemof" and substitute therefor --system of--.

UNITED STATES PATENT AND TRADEMARK OFFICE
CERTIFICATE OF CORRECTION

PATENT NO. : 4,626,099

DATED : December 2, 1986

INVENTOR(S) : Robert D. Zuelke, et al.

It is certified that error appears in the above-identified patent and that said Letters Patent are hereby corrected as shown below:

Column 18, line 17, delete "endof" and substitute therefor --end of--.

Column 18, line 31, delete "duplicat" and substitute therefor --duplicate--.

Column 18, line 36, delete "tolight" and substitute therefor --to light--.

Column 18, line 60, delete "of system".

Column 18, line 61, after "wherein" insert --said safety shutter is mounted on said one side of said wall--.

Signed and Sealed this

First Day of September, 1987

Attest:

DONALD J. QUIGG

Attesting Officer

Commissioner of Patents and Trademarks